United States Patent [19]

Burton

[11] 4,321,786
[45] Mar. 30, 1982

[54] GRAPE HARVESTER WITH CANE LIFTER

[75] Inventor: Charles G. Burton, Lewiston, N.Y.

[73] Assignee: Chisholm-Ryder Company, Inc., Niagara Falls, N.Y.

[21] Appl. No.: 165,856

[22] Filed: Jul. 7, 1980

Related U.S. Application Data

[60] Division of Ser. No. 643,504, Dec. 22, 1975, Pat. No. 4,251,983, which is a continuation-in-part of Ser. No. 546,283, Feb. 3, 1975, abandoned.

[51] Int. Cl.³ .......................................... A01D 46/00
[52] U.S. Cl. ........................................ 56/330; 56/119
[58] Field of Search ........................... 56/119, 95, 330

[56] References Cited

U.S. PATENT DOCUMENTS

| | | | |
|---|---|---|---|
| 2,571,224 | 10/1951 | Edwards | 56/13.5 |
| 2,648,944 | 8/1953 | Powers | 56/119 |
| 2,893,193 | 7/1959 | Gilbert | 56/27 R |
| 3,119,221 | 1/1964 | Martin | 56/119 |
| 3,360,913 | 1/1968 | Burton | 56/330 |
| 3,572,018 | 3/1971 | Broussard | 56/119 |
| 3,584,444 | 6/1971 | Sammann et al. | 56/119 |
| 3,593,507 | 7/1971 | Mohn | 56/119 |
| 3,596,448 | 8/1971 | Van Buskirk | 56/95 |
| 3,596,457 | 8/1971 | Van Tine et al. | 56/330 |
| 3,673,774 | 7/1972 | Mizzi | 56/13.9 |
| 3,703,072 | 11/1972 | Patzlaff | 56/330 |
| 3,705,482 | 12/1972 | Purrer | 56/13.9 |
| 4,251,983 | 2/1981 | Burton | 56/331 |

Primary Examiner—Paul J. Hirsch
Attorney, Agent, or Firm—Joseph P. Gastel

[57] ABSTRACT

A grape harvester for harvesting grapes from vines having cane thereon in shielding relationship to grape bearing portions of the vines including a frame, harvesting members mounted on the frame for effectively engaging the grape bearing portions of the vines to harvest grapes therefrom, and cane lifters on the frame for lifting the cane out of the path of the harvesting members to thereby permit direct access of the harvesting members to the grape bearing portions of the vines and/or to the cordon wires which support the grape bearing portions of the vines. The cane lifters can be in the form of a chain conveyor, or a walking beam arrangement, or a rotating screw-like member, or a lifting rod.

14 Claims, 27 Drawing Figures

GRAPE HARVESTER WITH CANE LIFTER

This is a division of application Ser. No. 643,504 filed on Dec. 22, 1975 now U.S. Pat. No. 4,251,983 which is a continuation-in-part of application Ser. No. 546,283, filed Feb. 3, 1975, now abandoned.

The present invention relates to an improved grape harvester, and more particularly to a grape harvester having a cane lifter.

By way of background, certain grapevine growths possess an extremely large amount of cane which overlies and shields the grape bearing portions of the vines and the cordon wires and therefore hinders the harvesting because it prevents good contact between the harvesting mechanism and the grape bearing portions of the vines and/or the cordon wires which support the vines. Harvesting of such growths is presently effected by striking at the grape bearing portions through the cane and this is inefficient and undesirable for four reasons. The first reason is that the grape bearing portions of the vines, being shielded by the cane, are not contacted and/or shaken to the desired degree and therefore less than the maximum amount of grapes are harvested. The second reason is that striking the cane with excessive force results in the breaking thereof and the bruising of the buds, which could result in decreased growth in the following year because the cane forms the basis for the next year's growth. The third reason is that striking of the cane results in excessive removal of leaves from the cane which requires added effort in separating leaves from the grapes and also results in decreased vine growth in the following year. The fourth reason is that the relatively large striking force required to harvest the grapes by striking at them through the cane results in excessive damage to those grapes which are harvested. It is with the overcoming of the foregoing deficiencies in grape harvesting that the present invention is concerned.

It is accordingly the primary object of the present invention to provide an improved grape harvester mounting a cane lifter which lifts the cane away from the grape bearing portions of the vine and the cardon wires to thereby permit the harvester to have more direct access to such grape bearing portions and/or to the cordon wires to therefore effect harvesting with greater efficiency. A related object of the present invention is to further increase harvesting efficiency by lifting the low-growing grapes slightly higher into the path of the vine beaters incidental to the lifting of the cane.

Another object of the present invention is to provide an improved grape harvester having an arrangement for lifting the cane out of the path of the harvesting mechanism, whether it be a vine beater or wire striker, or both, to thereby lessen the damage to such cane and also lessen the leaf removal therefrom to thereby insure a healthier vine for the next year's growth. A related object of the present invention is to lift the cane out of the path of the harvesting mechanism to thereby reduce the amount of leaves which are removed from the cane and therefore reduce the effort involved in separating such leaves from the grapes.

Yet another object of the present invention is to provide an improved grape harvester for lifting cane out of the path of the harvesting mechanism so that the grapes which are harvested are in relatively good condition because the excessive force otherwise required in beating through the cane is not required when the cane is lifted so that the harvesting mechanism can engage the grape bearing portions more directly.

Still another object of the present invention is to provide an improved combined cane lifter and harvesting device which incidental to its cane lifting function strips grapes from the short "fruiting cane" which is difficult to harvest.

A still further object of the present invention is to provide a rod-type cane lifter construction which can be attached to an existing grape harvester. Other objects and attendant advantages of the present invention will readily be perceived hereafter.

The present invention relates to a grape harvester for harvesting grapes from vines having cane thereon in shielding relationship to grape bearing portions of said vines comprising a frame, harvesting means on said frame for harvesting grapes from said grape bearing portions of said vines, and cane lifter means on said frame for lifting said cane out of the path of said harvesting means so that said cane is not engaged by said harvesting means. In its more specific aspect, the present invention includes guide means associated with the cane lifter means to maintain the cane out of the path of the harvesting means during harvesting. In accordance with a still further aspect of the present invention a cane lifter is provided which harvests grapes from low growing fruit cane incidental to its general function of lifting cane out of the path of the harvesting means. The various aspects of the present invention will be more fully understood when the following portions of the specification are read in conjunction with the accompanying drawings wherein:

Figure 1:
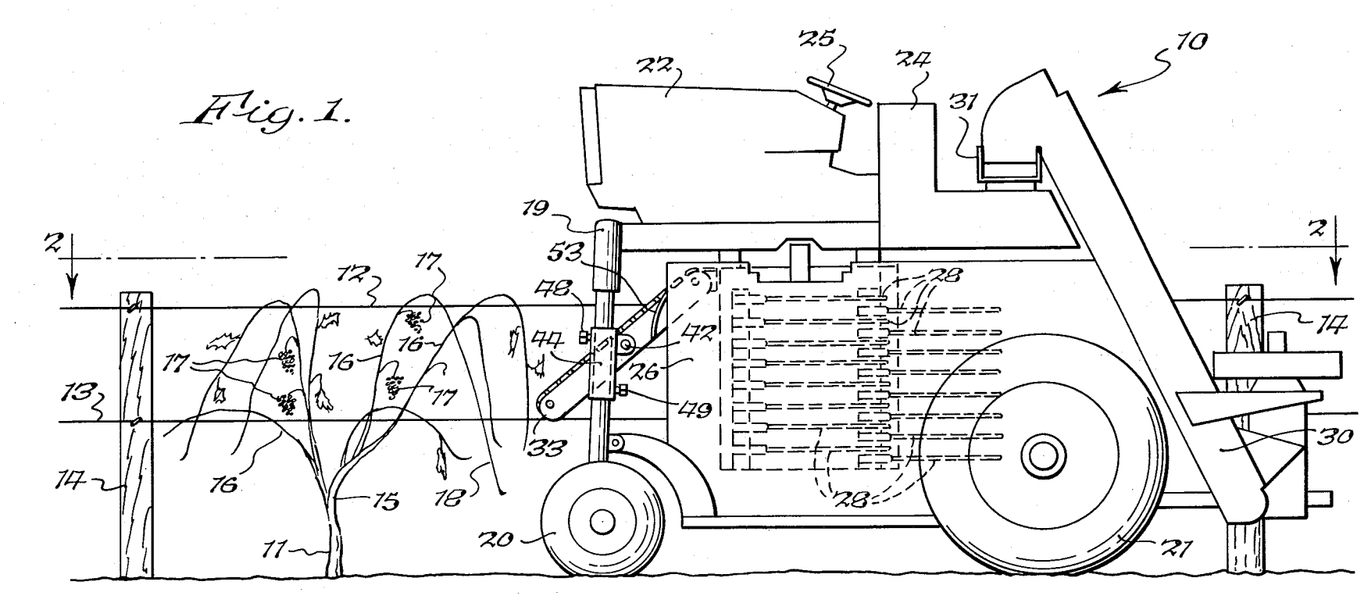
FIG. 1 is a side elevational view of the improved grape harvester of the present invention shown in relation to a single curtain grape vine formation.
Figure 2:
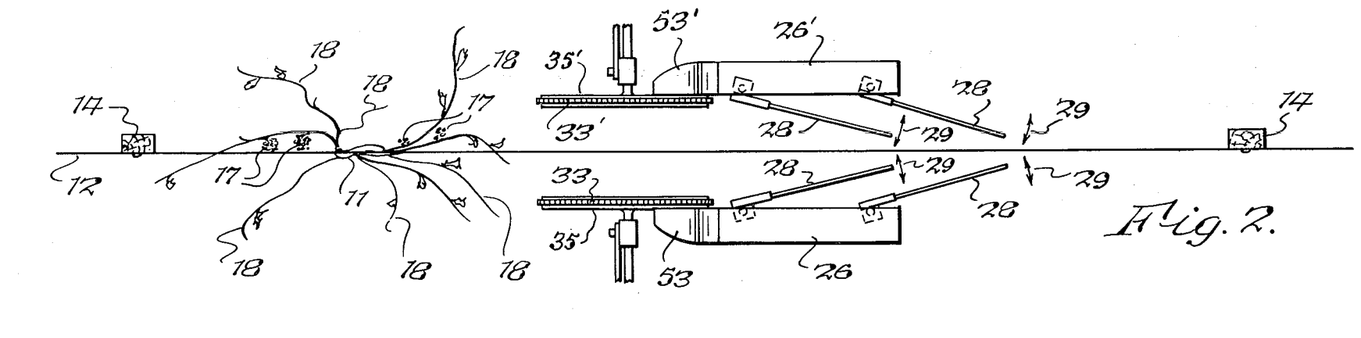
FIG. 2 is a fragmentary plan view taken substantially along line 2—2 of FIG. 1 with certain portions of the harvester omitted in the interest of clarity.
Figure 3:
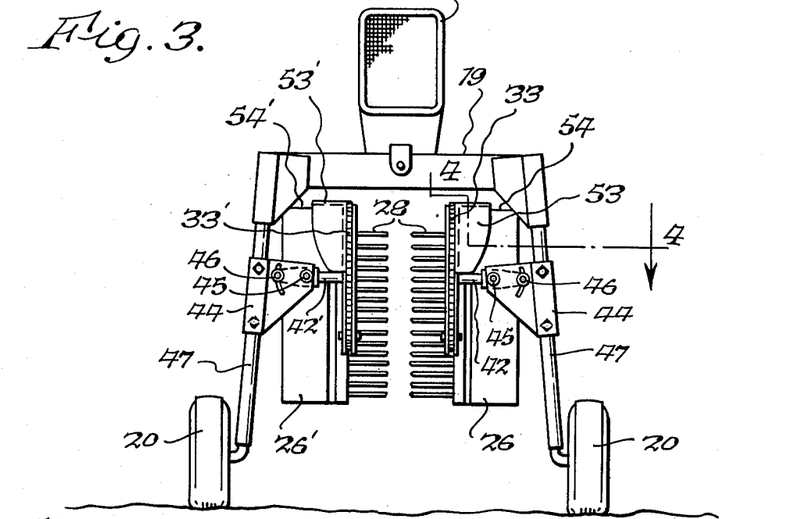
FIG. 3 is an elevational view of the harvester taken from the left of FIG. 1.

The improved harvester 10 of the present invention is shown in FIGS. 1 and 2 in relation to a single curtain vine formation wherein the grapevines 11 are grown on wires 12 and 13 which are strung between spaced posts 14. Each grapevine 11 includes a main trunk 15, the grape bearing portions 16, which carry clumps of grapes 17, and cane portions 18. The grape bearing portions 16 lie substantially along the wall defined by wires 12 and 13 and the cane 18 is located on opposite sides of the foregoing wall in obscuring relationship to the grape bearing portions 16. Whenever an attempt is made to harvest grapes by beating the vines from opposite sides, it is the cane 18 which is contacted by the beaters, and since cane 18 shields or obscures the grape bearing portions 16, the harvesting is not as efficient as it would be if the grape bearing portions 16 were contacted directly by harvesting portions of the grape harvester. In certain growth formations, depending on growing conditions, the cane is so thick that it is extremely difficult to penetrate it to efficiently remove grapes from the underlying grape bearing portions.

Broadly, harvester 10 includes an inverted U-shaped frame 19 mounting a pair of front wheels 20 and a pair of rear wheels 21. The harvester is driven by an engine 22 mounted on the top of frame 19, and the operator sits in a seat 24 and steers the harvester in straddling relationship to a row of grapevines by manipulating steering wheel 25 which is suitably coupled to front wheels 20 through an appropriate linkage. Suitably mounted on frame 19 are spaced modules 26 and 27 which carry vine beater rods 28 which extend rearwardly. Suitable drive mechanism (not shown) which is well known, drives arms 28 in an oscillating manner in the direction of arrows 29 so as to cause them to beat the grapevines. This oscillation may be such that each opposed pair of arms 28 pivots simultaneously in the same direction, with the front pair oscillating in a direction opposite to the rear pair so as to provide a fishtailing effect, or each pair of arms can simultaneously oscillate in opposite directions toward and away from each other, with the front arms and the rear arms operating in a predetermined sequence relative to each other. Furthermore, arms 28, instead of being cylindrical rods, as shown, may comprise broad paddles with fingers at the outer ends thereof. The exact configuration of the arms will depend on the specific grapes which are being harvested.

As is well understood, as harvester 10 moves along the row of grapevines, the vines will be beaten by arms 28 and cause the grapes so harvested to fall on catcher leaves (not shown) at the bottom of the harvester. These catcher leaves extend substantially from the front of the harvester to the rear thereof and they are retractible when they engage posts 14, as is well understood. Thereafter, the grapes pass onto conveyors (not shown) adjacent the catcher leaves which move them rearwardly to elevator conveyors 30 at the rear of the harvester from which they pass onto a delivery conveyor 31 which drops them into containers mounted on a truck which travels in parallel relationship with harvester 10 along the row of grapevines.

As mentioned briefly above, grapevines grown under certain conditions possess a great amount of cane which obscures and shields the grape bearing portions, thereby making it extremely difficult to harvest the grapes. In accordance with the present invention, a cane lifter is incorporated into the grape harvester to lift the cane out of the way to thereby permit the harvesting arms 28 to have direct access to the grape bearing portions 16 of the vines. This results in increased picking efficiency.

One form of the cane lifter of the present invention is shown in FIGS. 1–7. This form essentially consists of a pair of endless chain assemblies 33 and 33' mounted in spaced relationship on the harvester. At this point it is to be noted that chain assembly 33' is a mirror-image of chain assembly 33 and therefore in the interest of brevity, only chain assembly 33 will be described, it being understood that the primed numerals associated with chain assembly 33' which correspond to the unprimed numerals associated with chain assembly 33 refer to corresponding elements of structure. Chain assembly 33 mounts an endless chain 34 on a frame member 35 which is essentially a member having a groove 36 on its entire outer periphery, with groove 36 being bounded by flange portions 37 and 38 at the top of frame 35 and flange portions 37a and 38a at the bottom of frame 35 to confine chain 34 to groove 36. Chain 34 extends above flange portions 37 and 38 to engage cane and carry it rearwardly. A motor 39 is suitably mounted on frame 35 and it drives a gear (not shown) which is in mesh with chain 35 and causes it to travel in the direction of arrow 40. A sprocket 41 at the front of chain assembly 35 guides the lower end of chain 34. The upper run of chain 34 will move at the proper speed in the direction of arrow 40 as the harvester moves in the direction of arrow 41 so as to carry the cane upwardly with relatively little abrasion.

Figures 4, 5, 6:
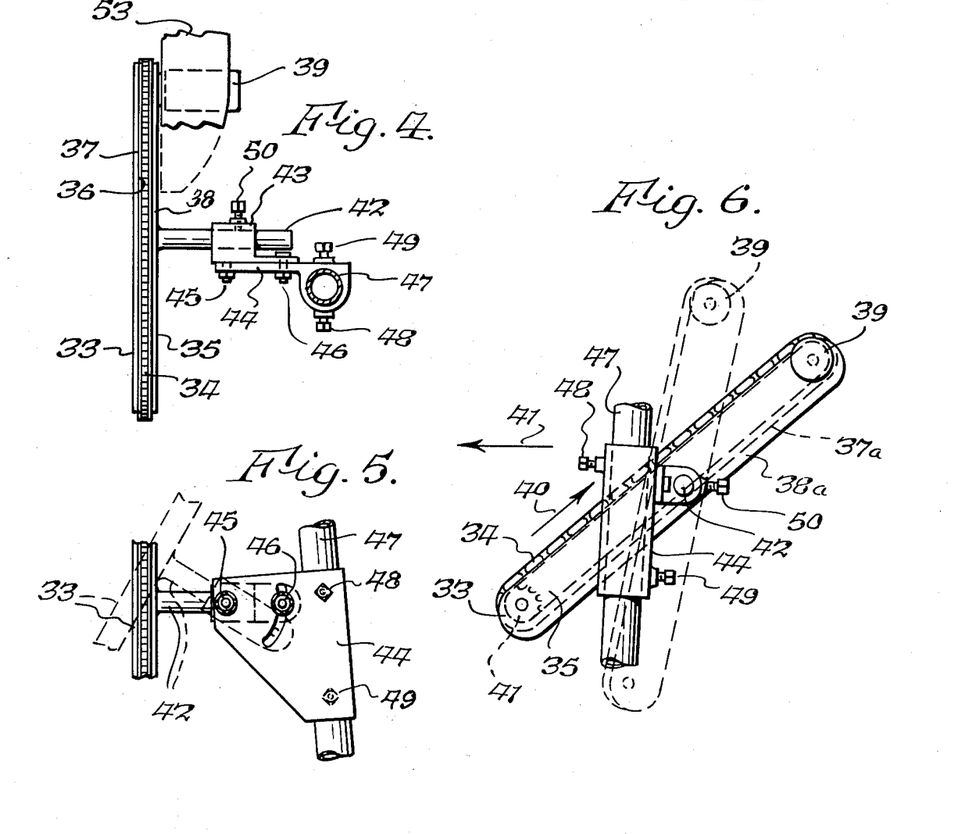
FIG. 4 is a fragmentary cross sectional view taken substantially along line 4—4 of FIG. 3.
FIG. 5 is a fragmentary enlarged view of a portion of FIG. 3 showing the manner in which the cane lifter can be adjusted.
FIG. 6 is a view taken from the right of FIG. 5.

Chain assemblies 33 and 33' are mounted for adjustment in three planes. In this respect, a round shaft 42 has one end suitably secured to plate 35, as by welding, and it is shaft 42 which mounts chain assembly 33 on harvester 10. In this respect, shaft 42 is received within sleeve 43 mounted on bracket 44 by means of bolts 45 and 46. Bracket 44, in turn, is mounted on leg 47 of the harvester by means of screws 48 and 49. If it should be desired to change the inclination of the chain 34, as depicted in FIG. 6, it is merely necessary to loosen set screw 50 in sleeve 43 and thereafter rotate shaft 42 to any desired attitude and thereafter retighten set screw 50. If it is desired to adjust the position of chain assembly 33 in its entirety about the axis of leg 47, it is merely necessary to loosen set screws 48 and 49, rotate bracket 44 about the axis of leg 47 to an adjusted position, and thereafter retighten set screws 48 and 49. If it is desired to change the attitude of chain assembly 33 between the various positions, such as shown in FIG. 5, it is merely necessary to loosen bolts 45 and 46 and thereafter pivot sleeve 43 about the axis of bolt 45, permitting bolt 46 to move to a new position in slot 51 in bracket 44. When the chain assembly 33 has reached its adjusted position, it is merely necessary to retighten bolts 45 and 46 to retain chain assembly 33 in its adjusted position. It will be appreciated that each of the foregoing adjustments are independent of the other and therefore chain assembly 33 can be adjusted in three different planes to any desired attitude, as may be required with the cane being lifted. In view of the fact that chain assembly 33' is a mirror-image of chain 33, there are corresponding adjustments thereon.

Cane guides 53 and 53', which are curved metal plates, are suitably attached to frames 35 and 35' at the upper end of chain assemblies 33 and 33'. Thus, after the cane is elevated to the upper portions of the chain assemblies 33—33', it will ride over guides 53—53' and thereafter ride over the tops 54—54' of modules 26—26', which thereafter function as guides. If desired, cane guides 53—53' can extend over the top of modules 26—26' for any length desired.

Figures 7, 8, 9, 10:
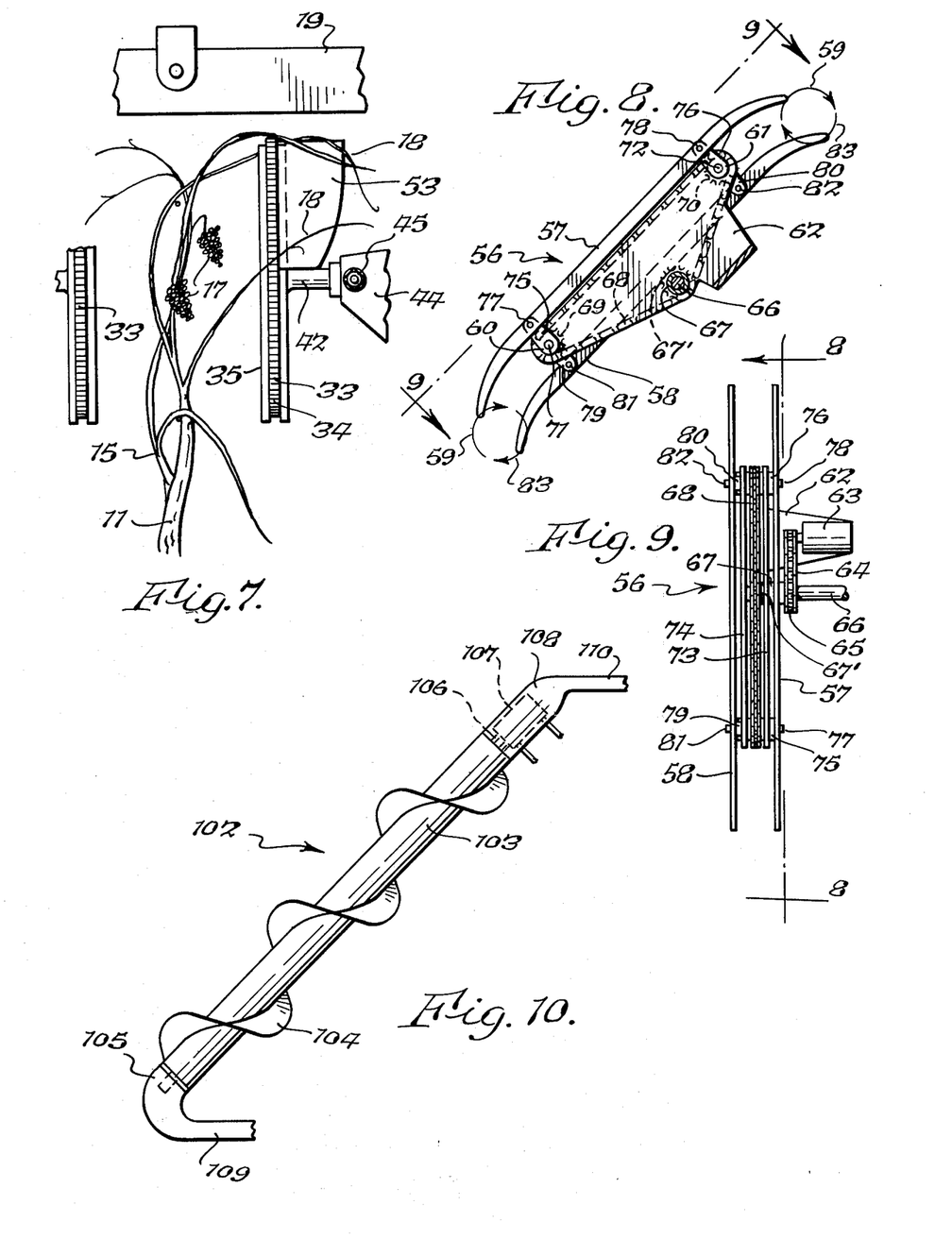
FIG. 7 is a fragmentary view taken in the same direction of FIG. 3 and showing how the cane lifter lifts the cane.
FIG. 8 is a fragmentary cross sectional view taken substantially along line 8—8 of FIG. 9 and showing another construction utilizing a walking beam which can be used as a cane lifter.
FIG. 9 is a view taken substantially in the direction of line 9—9 of FIG. 8 and showing details of the drive for the walking beams.
FIG. 10 is a side elevational view of a screw type of conveyor which may be utilized for lifting the cane.

It will be appreciated that cane lifters 33—33' will lift the cane upwardly and guides 53—53' will guide the cane over the modules 26—26' which will thereafter function as guides, thereby permitting arms 28 to have direct access to the grape bearing portions 16 of the vines because the cane 18 will no longer shield such portions, as depicted in FIG. 7. After the harvester has passed by an area where the cane has been lifted, the cane will return to the position which it occupied before the grape harvester arrived. It will be appreciated that the cane must not be bruised, broken or otherwise damaged, to any great degree, because it is this cane which forms the basis for the next year's growth. A certain amount of bruising and breakage of the cane cannot be avoided, but this is kept to a minimum because of the manner in which the cane is handled in its path through the harvester.

In FIGS. 8–9 another form of cane lifter is shown. This form is in the nature of a walking beam arrangement 56 having elongated members 57 and 58 which alternately assume the position shown for member 57 in FIG. 8 and move in the direction of arrows 59 and 83 as crankarms 60 and 61 rotate. In this respect, a bracket 62, attached to plate 73, mounts a motor 63 which drives chain 64 which in turn encircles a sprocket 65 keyed to sleeve 67 journalled on shaft 66. Sleeve 67 also has a sprocket 67' keyed thereto which drives chain 68 which in turn encircles sprockets 69 and 70 keyed to shafts 71 and 72, respectively, which are journalled in spaced plates 73 and 74.

Arms 75 and 76, which are keyed to shafts 71 and 72, respectively, pivotally support elongated beam member 57 at pivot points 77 and 78, respectively. Arms 79 and 80, which are keyed to shafts 71 and 72, respectively, pivotally support walking beam member 58 at pivot points 81 and 82, respectively. It can therefore be seen that as shafts 71 and 72 are driven by chain 68, walking beam members 57 and 58 will travel in the direction of arrows 59 and 83, respectively, so as to engage cane and lift it upwardly and rearwardly relative to the harvester.

Shaft 66 has one end suitably connected to the bearing plates 73 and 74 in such a manner that it supports them and therefore supports the entire assembly mounted on the bearing plates. Shaft 66, in turn, can be supported in the same manner discussed above relative to FIGS. 4, 5 and 6 to thereby provide universal adjustability to the walking beam assembly 56 of FIGS. 8 and 9. It will also be appreciated that two walking beam assemblies are mounted on the harvester in the same manner as two chain assemblies were mounted in the embodiment of FIGS. 1–7, with each of the assemblies being a mirror-image of the other. In addition, cane guides, such as 53, 53', may be mounted on the harvester and associated with the walking beam assemblies of FIGS. 8 and 9 to carry the cane over to the tops of the modules 26—26' as the harvester moves along the row of grapevines.

Figure 11:
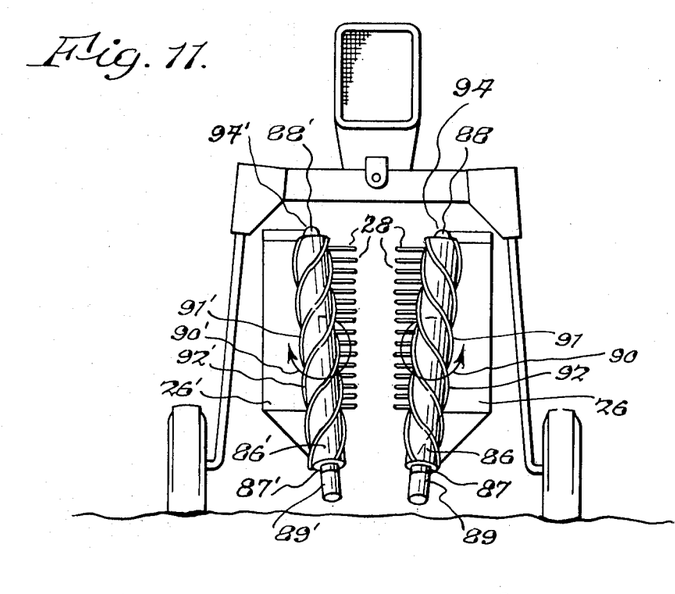
FIG. 11 is a front elevational view of a grape harvester mounting a still further type of cane lifter comprising rotating threaded cylinders.
Figure 12:
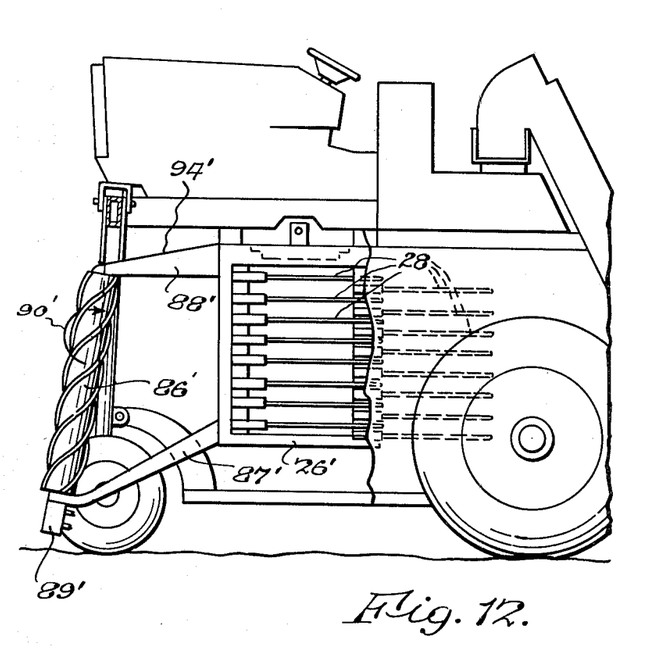
FIG. 12 is a fragmentary side elevational view with portions broken away taken from the right of FIG. 11.

In FIGS. 11 and 12 a still further embodiment of the present invention is disclosed. In this embodiment a pair of hollow cylinders 86—86' are mounted on the front of the machine. As shown in FIG. 12, lower arms 87—87' journal the lower ends of cylinders 86—86' and upper arms 88—88' journal the upper ends. Arms 87-88 and 87'-88' are supported by modules 26 and 26', respectively. Motors 89—89' are mounted on arms 87—87' and drive cylinders 86—86' in the direction of arrows 90—90', respectively. Cylinders 86—86' have a double thread 91-92 and 91'-92', respectively, on the outer surfaces thereof so that as the harvester is traveling forwardly and cylinders 86 and 86' are rotating in the directions of arrows 90 and 90', respectively, cane which is engaged by the threads 91-92 and 91'-92' will be lifted upwardly until such time as such cane engages surfaces 94—94' of arms 88—88' which guides the cane across to the tops of modules 26—26' which thereafter function as guides. If desired, a separate cane guide 53 may be utilized rather than the tops 94—94' of arms 88—88'. While cylinders 86—86' have been shown as mounted on modules 26—26', it will be appreciated that arms, such as 87-88, may be attached directly to frame 19 of the machine or any other members carried by the frame.

Figure 13:
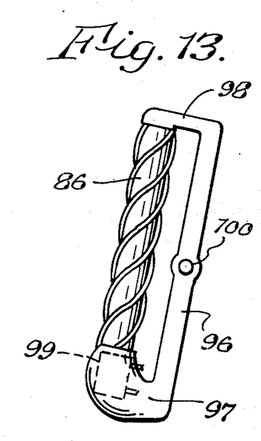
FIG. 13 is a fragmentary side elevational view of a cylinder such as shown in FIGS. 11-12 but mounted on a member which permits adjustment thereof.

An alternate form of mounting for cylinder 86 is shown in FIG. 13 wherein a U-shaped frame 96 has a lower portion 97 which journals the lower end of cylinder 86 and an upper portion 98 which journals the upper end of cylinder 96. A motor 99 on portion 97 drives the cylinder 86 in the desired direction. Frame 96 has a shaft 100 (which is analogous to shaft 42) mounted thereon which can be received in a support assembly, such as shown in FIGS. 4, 5 and 6, to thereby permit universal adjustability of cylinder 86 to an optimum attitude for lifting cane out of the path of the members which engage the grape-carrying portions of the vines.

A still further embodiment of the present invention is shown in FIG. 10. This embodiment comprises an inclined screw 102 which is broadly similar to the cylinders 86—86' of FIGS. 11–12. The inclined screw includes a central portion 103 with a helical flight 104 wound thereon. The lower portion of shaft 103 is supported in bearing 105 and the upper portion is supported in bearing 106. A motor 107, which may be hydraulic, is housed in bearing housing 108 and drives shaft 103. Brackets 109 and 110 form continuations of bearings 105 and 108, respectively, for mounting screw 102 on the frame of the harvester. If desired, brackets 109 and 110 may form a part of a frame, such as 96 shown in FIG. 13 so that the screw 102 may be adjusted by mounting it on a support assembly such as shown in FIGS. 4, 5 and 6. It will be appreciated that two screws 102 are used in the same manner as all of the other vine lifters shown in the preceding embodiments.

In FIGS. 14–26 a rod-type cane lifter construction 110 is shown mounted on grape harvester 111 which may be identical in all respects to the grape harvester 10 shown in FIGS. 1–13. The only difference is in the construction of the cane lifter. Harvester 110 includes a plurality of plates or leaves 112 and 112', each of which is swingable about an associated pin such as 113 and 113', respectively, in a counterclockwise and clockwise direction, respectively, as is well known in the art. These leaves yield when they encounter posts such as 114 which support the trellis wires 115, and after they are free of posts 114, they return to the position shown in FIG. 15 under the action of suitable springs (not shown). As is well understood, the grapes which are harvested from the grapevines by arms 128 drop onto the bed provided by leaves 112—112' and then the grapes slide downwardly onto conveyor belts 115 and 115' which carry the grapes rearwardly on the harvester, as described above relative to FIGS. 1 and 3.

The improved rod-type cane lifter construction 110 comprises two mirror image counterparts 116 and 116'. Therefore, the following description will be confined to counterpart 116 with the understanding that the counterpart 116' is identical thereto except that it is reversed. The primed numerals associated with counterpart 116' represent the mirror images of the structure designated by the identical unprimed numerals associated with counterpart 116.

Rod-type cane lifter portion 116 includes an elongated inclined rod 118 having a central straight portion 117, a curved lower portion 119, and a curved upper portion 120 which is suitably secured relative to the frame of harvester 111. Essentially, as the harvester travels in a forward direction 220 (FIG. 18), the overhanging portions of cane 221-222 are cammed upwardly along rod 118 in the direction of arrow 223. The cane which is long enough will follow up rod 118 to curved portion 120 and thereafter ride over the tops of modules 126, 126' and therefore be kept away from the oscillating arms 128. Guides, such as 53—53', (FIG. 2) may be mounted proximate top curved portions 120—120' of rods 118—118', respectively, to guide the cane across modules 126—126', respectively, as explained relative to the preceding embodiments of the invention. Modules 126—126' may be identical to modules 26—26' of FIGS. 1–13.

Figures 17, 18, 25:
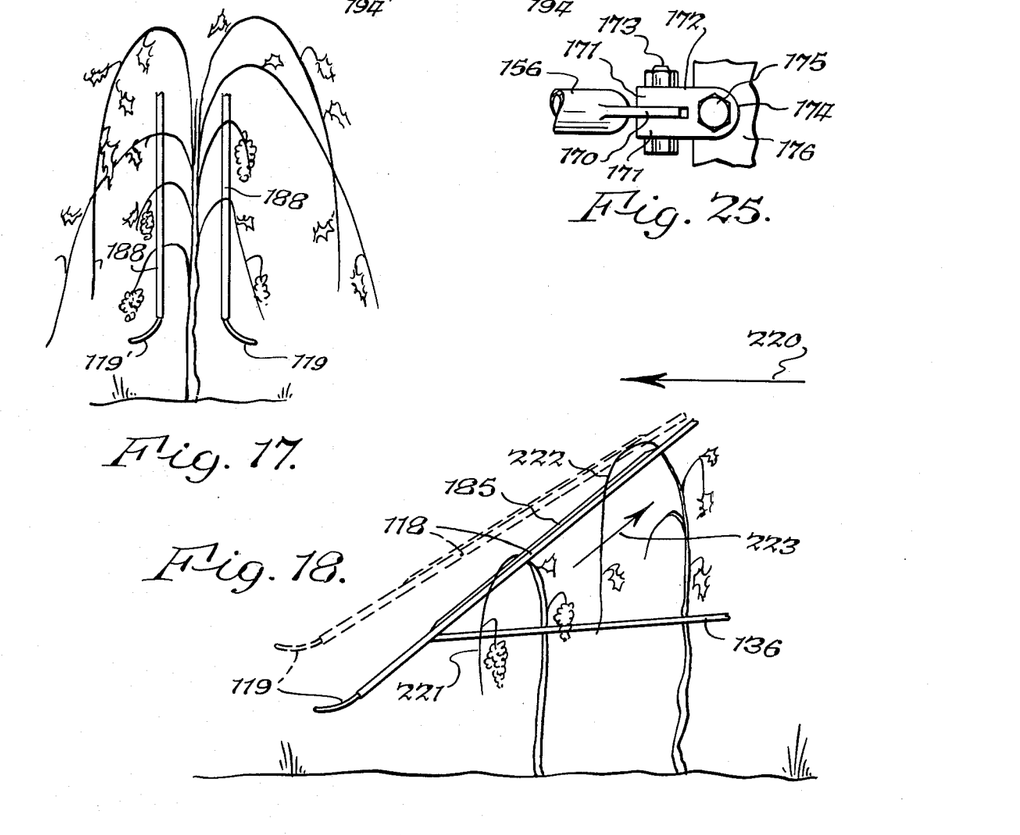
FIG. 17 is a fragmentary front elevational view showing how bunches of grapes on fruit cane are oriented relative to the lifting rods.
FIG. 18 is a fragmentary side elevational view showing the orientation of the rod-type of cane lifter as it moves along the row of grapevines.
FIG. 25 is a view taken in the direction of arrows 25—25 of FIG. 19 and showing the configuration of the linkage in this area.

Rod 118 is adjustably mounted on harvester 111 so that its angle of inclination may be adjusted as represented by the solid and dotted line positions shown in FIG. 18. In this respect, for certain harvesting applications it may be desirable to have a steeper angle as shown by the solid line position and for other harvesting applications it may be desirable to have a more gradual angle as shown by the dotted line position of rod 118.

To mount the upper end of rod 118, a bracket 121 is provided (FIGS. 19, 20 and 21) which includes a flat portion 122 which is placed in abutting relationship with frame member 123 and is secured thereto by means of nut and bolt assembly 124. Member 123 is mounted on module 126. A pair of parallel tabs 125 have first ends welded to the rear 127 of plate 121. Tabs 125 form a clevis connection with sleeve 129 which is welded at right angles to sleeve 130. A nut and bolt assembly 131 extends through aligned apertures 140 in tabs 125 and through sleeve 129 so that sleeve 129 can pivot freely about bolt 131. Sleeve 130, which is welded at right angles to sleeve 129, is loosely mounted on reduced portion 132 (FIG. 19) at the end of rod portion 120 and is retained in position by collar 133 having set screw 134 attaching it to reduced portion 132. Because of the pivotal connection between sleeve 130 and reduced portion 132, rod 118 may be pivoted about the axis of sleeve 130 in the opposite directions depicted by arrow 135 (FIG. 20).

Figures 19, 23, 24, 27:
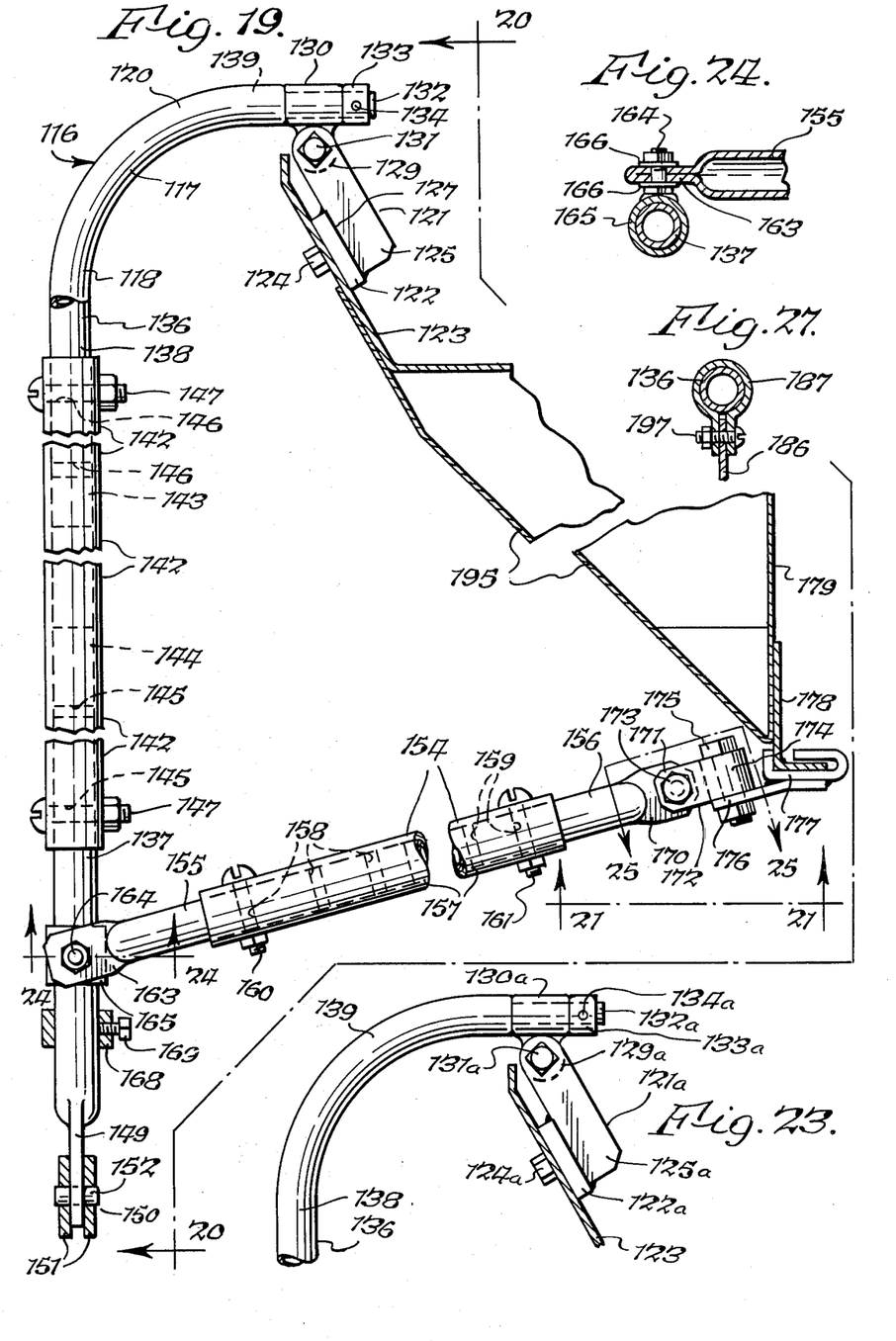
FIG. 19 is a fragmentary view taken generally in the direction of line 19—19 of FIG. 16 and showing in greater detail the specific construction of the rod-type of cane lifter.
FIG. 23 is a fragmentary view partially in cross section taken substantially in the direction of line 23—23 of FIG. 20 and showing the construction of the curved supported end of the lower rod.
FIG. 24 is a fragmentary cross sectional view taken substantially along line 24—24 of FIG. 19 and showing the construction of the linkage in this area.
FIG. 27 is a fragmentary cross sectional view taken substantially along line 27—27 of FIG. 15.

In order to effect the pivotal movement of rod 118 in directions 135 to adjust its angle of inclination, as depicted in FIG. 18, lower rod or link 136 is lengthened or shortened. Lower link 136 (FIGS. 19 and 20) includes a forward end portion 137 and a rear end portion 138 which merges into a curved arm portion 139 (FIG. 23) which has the same curvature as curved portion 120 of rod 118 and lies directly below it (FIG. 19). A bracket 121a (FIGS. 20 and 23), which is identical in all respects to bracket 121, mounts a reduced end portion 132a (FIG. 23) extending from curved portion 139 in sleeve 130a which is welded at right angles to sleeve 129a which is pivotally mounted on bolt 131a extending through arms 125a attached to plate 122a which is mounted by bolt 124a to frame portion 123 of the machine. Thus, lower rod 136 can pivot in the direction of arrows 141 (FIG. 20) about the axis of sleeve 130a. At this point it is to be noted that bracket 121a is identical in all respects to bracket 121 and the designation a with each numeral associated with bracket 121a represents the same part represented by the identical numeral on bracket 121.

Figures 20, 21, 22, 26:
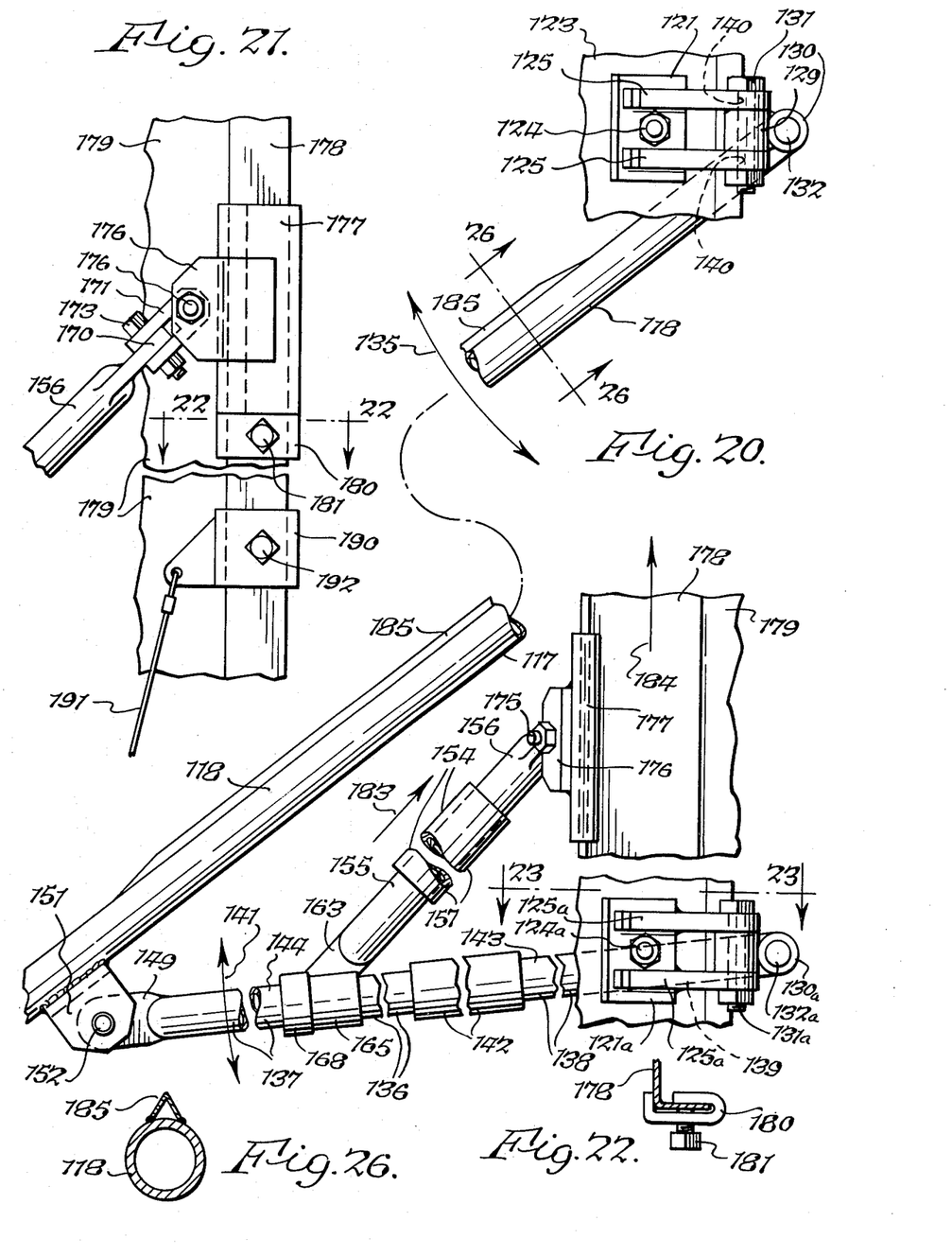
FIG. 20 is a fragmentary view taken generally along line 20—20 of FIG. 19 and showing further details of construction of the rod-type of cane lifter.
FIG. 21 is a fragmentary view taken substantially along line 21—21 of FIG. 19 and showing a side elevational view of the sliding bracket which mounts one of the support rods of the rod-type cane lifter.
FIG. 22 is a cross sectional view taken substantially along line 22—22 of FIG. 21 and showing the configuration of the holding bracket.
FIG. 26 is a cross sectional view taken substantially along line 22—22 of FIG. 20 and showing the configuration of the rod which actually lifts the cane and also strips grapes therefrom.

To lengthen or shorten lower rod 136, an elongated sleeve 142 is provided which fits onto the free end portions 143 and 144 of arm portions 138 and 137, respectively (FIGS. 19 and 20). A plurality of spaced bores 145 are provided in end portion 144 and a plurality of spaced bores 146 are provided in end portion 143. Nut and bolt assemblies 147 may be inserted between aligned apertures in sleeve 142 and through any one of the desired bores, such as 145 and 146 in rod portions 137 and 138, respectively. By this method the effective length of lower rod 136 may be varied so as to cause the end portion 149 to be moved toward and away from curved portion 139 at the opposite end thereof. Reduced end portion 149 (FIG. 19) forms a clevis connection at 150 with parallel plates 151 which are welded to the underside of rod 118, with pin 152 completing the clevis connection, which permits relative pivotal movement between portion 149 and plates 151.

Once the length of lower rod 136 has been adjusted, upper rod 118 will be maintained at the desired inclination because the two rods are connected at clevis 150 and their opposite ends are mounted in fixed position relative to frame 123 by means of brackets 121 and 121a.

Figure 15:
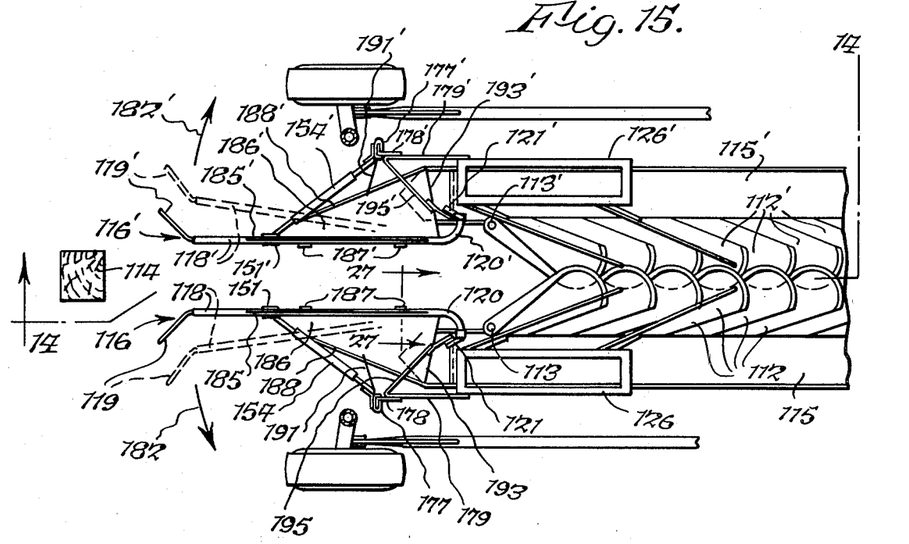
FIG. 15 is a fragmentary view partially in cross section taken substantially along line 15—15 of FIG. 14.
Figure 16:
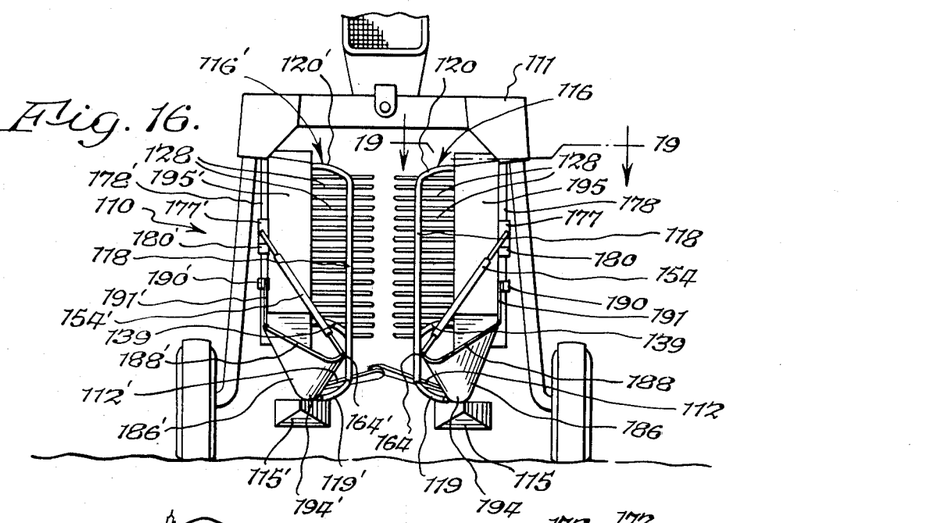
FIG. 16 is a fragmentary end elevational view taken from the left of FIG. 14.

In order to define the orientation of rods 118 and 118' relative to the longitudinal axis of the harvester, as depicted by the solid and dotted line positions of rods 118 and 118' in FIG. 15, an adjustment rod 154 is provided (FIGS. 16, 19 and 20). Rod 154 includes end portions 155 and 156 (FIG. 19) which are received in central sleeve 157. A plurality of bores 158 are provided in rod 155 and a plurality of bores 159 are provided in rod 156. Nut and bolt assemblies 160 and 161 may be caused to extend between predetermined bores 158 and 159, respectively, and aligned apertures in sleeve 157 so as to effectively lengthen or shorten rod 154.

Rod portion 155 of rod 154 has flattened end portion 163 loosely mounted on pin 164 (FIG. 24) which has its lower end welded to collar 165 which is loosely mounted on rod portion 137. Washers 166 are located on pin 164 and a nut 167 secures the parts in assembled relationship so that rod portion 163 can pivot on pin 164. The combined pivotal action of portion 163 on pin 164 and the loose pivotal action of sleeve 165 on rod 137 provides an universal type of movement. A collar 168 is adjustably positioned on lower rod portion 137 by means of set screw 169 to thereby provide an adjustable abutment for the end of sleeve 165, which can also move axially on rod portion 137.

The end 56 of rod 154 is formed into a flattened portion 170 which is received between sides 171 (FIG. 25) of fitting 172 to form a clevis connection with bolt 173. A sleeve portion 174 (FIG. 19) is formed at the end of fitting 172 to receive nut and bolt assembly 175 which fastens fitting 172 to plate 176 which is welded to slide member 177 which in turn can move rectilinearly on angle bracket 178 which has its longer leg mounted on frame member 179 mounted on module 126. Sleeve 174 can pivot about bolt 175. As can be seen from FIGS. 14 and 16, angle 178 extends for substantially the entire height of the module 126 on which it is mounted. A bracket 180 of the same cross sectional shape as slide 177 (FIGS. 21 and 22) may be secured at any desired elevation on angle 78 by means of set screw 181. This will determine the lower limit of travel of slide 177.

After the rod-type cane lifter 110 of the present invention has been adjusted so that rods 118-118' extend at the proper front-to-rear inclination (FIG. 18) and are located in the desired orientations relative to the harvester centerline (FIG. 15) by virtue of the foregoing adjustments, they will lift cane out of the path of the harvesting arms 128.

Figure 14:
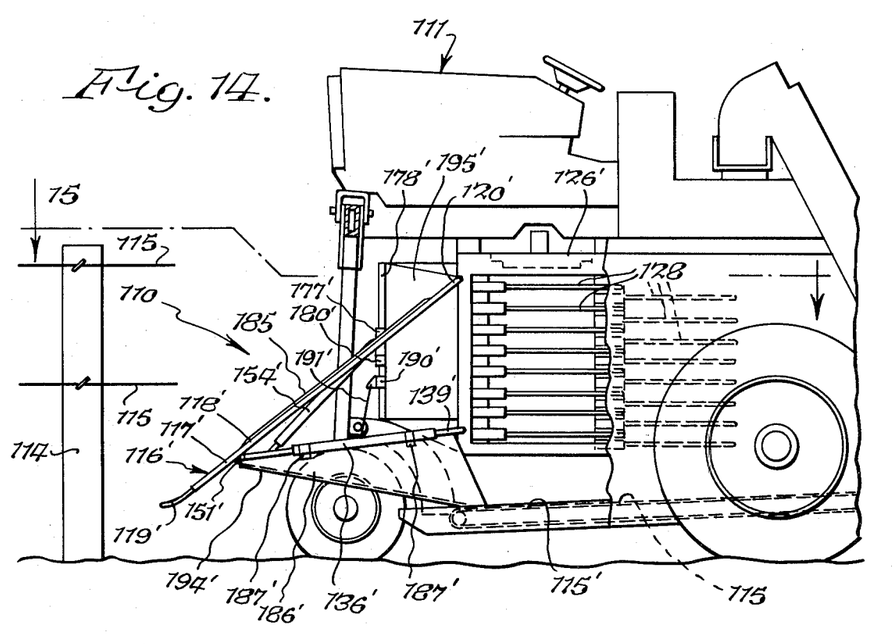
FIG. 14 is a fragmentary view partially in cross section taken substantially along line 14—14 of FIG. 15 and showing a rod-type of cane lifter mounted on a grape harvester.

From FIGS. 14 and 15 it can be seen that the lower ends 119—119' of rods 118—118' are bent outwardly. This permits rods 118 and 118' to move outwardly in the direction of arrows 182 and 182', respectively, in the event the rods strike some rigid object, such as post 114. The curvature of portions 119—119' provides a camming action. When the foregoing occurs, rods 118 and 118' may move to the dotted positions shown in FIG. 15. This is possible because of the manner in which the counterparts 116 and 116' of the rod-type cane lifter assembly 110 is mounted. More specifically, upper rod 118 and lower rod 136 will move in unison because they both will pivot about the axes of pins 131 and 131a which are in alignment with each other (FIGS. 19 and 20). Thus, the upper arm 118 and the lower arm 136 will move outwardly as a unit. This will cause link 154 to move in the direction of arrow 183 in FIG. 22 because sleeve 165 will be pushed to the right in FIG. 20 because of its abutting relationship with collar 168. This will cause slide member 177 to move in the direction of arrow 184 (FIG. 20) on angle 178. The foregoing compound movement of link 154 is possible because it has an universal connection at each end. The first universal connection is shown in FIG. 24 and the second universal connection is shown in FIG. 25.

The frictional engagement between slide 177 and angle 178 is sufficient to maintain lifting rod 118 in its normal position (wherein slide 177 abuts stop 180) against the various forces which it will encounter during harvesting. In this respect, the arm 118 will not move from its solid line to its dotted line position in FIG. 15 unless there is a sufficient force in the direction of arrow 182 (FIG. 15) to cause slide 177 to move upwardly on angle 178. When this force is removed, the weight of the assembly 116 consisting of arms 118 and 136 will cause the lifter rod 118 to return to the solid line position shown in FIG. 15. The lower limit of movement of slide 177 is determined by stop bracket 180 and this will prevent rods 118 and 118' from moving closer to each other than is permitted by the positions of stops 180 and 180'. If desired, a spring arrangement can be provided to bias slide 177 in a downward position.

The rod-type cane lifter shown in FIGS. 14-26 has the advantage that only a relatively small diameter rod extends downwardly in the area near the ground. This permits it to lift the low hanging fruit on the fruiting cane into the machine. This fruit would otherwise not be harvested. When the fruiting cane, such as shown in FIG. 17, is lifted in a manner such as shown in FIG. 18, the grapes will lie outwardly of the lifting rods 118 and 118'. However, as the harvester moves in the direction 220 (FIG. 18), the grapes will be lifted upwardly and will be sheared from the cane. In this respect, an angle member 185 (FIG. 26) is attached to the rod 118 and extends substantially along the entire length thereof from a position proximate clevis 150 to a position proximate the curved portion 120, as can be seen from FIG. 20. Angle 185 acts in the nature of a knife to strip entire bunches of grapes from the fruiting cane and thus increase the entire harvest. It is to be noted that the grape clumps are stripped from the fruiting cane because of the fact that they have more weight than the cane without fruit thereon. In other words, angle 185 will not strip significant amounts of leaves from the cane but will generally only strip clumps of grapes which provide greater resistance to the cane passing over the lifter rods.

In order to harvest the grapes which are stripped by rods 118 and 118', grape catching chutes 186 and 186' are provided. As can be seen from FIGS. 15 and 16, chutes 186 and 186' lie outwardly of rod 118 and 118', respectively. Suitable brackets 187 (FIG. 27) and 187' secure the inboard edges of chutes 186 and 186', respectively, to lower rods 136 and 136'. Each bracket 187 is essentially a strap loosely mounted about rod 136 and it has its opposite ends secured to chute 186 by nut and bolt assembly 197. The outboard edge 188 of chute 186 is attached to bracket 190 (FIG. 21) by means of cable 191. Bracket 190 may have the same cross section as bracket 180 and is adjustably mounted on angle 178 by means of set screw 192. Considering that rod 118 can only move toward angle 178 in the direction of arrow 182 (FIG. 15) from its most remote position, any such movement will cause chute edge 188 to approach bracket 190 to thereby lessen the tension on cable 191. In no instance will there be movement of such a nature as to tend to tear cable 191. Furthermore, chutes 186—186' may be fabricated out of light plastic material which is extremely flexible and resilient so that they can yield when struck by external foreign objects and thereafter return to their original shapes.

As can be seen from FIG. 15, the delivery ends 193, 193' of chutes 186 and 186', respectively, overlie conveyors 115 and 115', respectively, and further the lower sides 194 and 194' of the chutes are inclined downwardly in a rearward direction so that grapes which fall into these chutes will slide downwardly onto the conveyors and thereafter be carried along with the remainder of the grapes to a collection point.

As noted above, frame portions 123 and 179 are secured to the front ends of modules 126 and 126', as can be seen from FIGS. 15 and 19. Furthermore, sheet metal cane guides 195 and 195' are attached to portions 123 and 179 and extend across the front of each module for the purpose of guiding the cane toward the center of the machine so that it is not snagged on the leading edges of the modules.

The foregoing specific description has been directed to a harvester which utilizes beaters for directly engaging the opposite sides of the grape bearing portions of the vines. However, it will be appreciated that the cane lifters can also be used on harvesters which utilize wire strikers which strike the cordon wires to thereby indirectly engage the grape bearing portions and thus shake the grapes from the vines. In the latter case, the cane lifter will also lift the cane out of the way so that the wire strikers will have more direct access to the cordon wires without having to strike any cane which is interposed therebetween. It will be appreciated that the cane lifter can be also used with any harvesting mechanism which includes both vine beaters and wire strikers or any other type of arrangement for removing the grapes, considering that the purpose of the cane lifter is to lift the cane out of the way of the harvesting mechanism and therefore not only increase harvesting efficiency but also lessen cane damage and leaf removal. In fact, the cane lifter can be associated with any type of harvesting mechanism which must effectively engage the grape bearing portions either directly or indirectly to effect harvesting.

It will also be appreciated that while only a single curtain type of growth formation has been shown in the drawings, the improved harvester of the present invention may also be used with other types of growth formations where the cane interferes with efficient harvesting.

While preferred embodiments of the present invention have been disclosed, it will be appreciated that it is not limited thereto but may be otherwise embodied within the scope of the following claims.

What is claimed is:

1. A grape harvester for harvesting grapes from vines having cane thereon in shielding relationship to grape-bearing portions of said grapevines comprising a frame, harvesting means on said frame for harvesting grapes from said grape-bearing portions, cane lifter means mounted on said frame for lifting said cane out of the path of said harvesting means so that said cane is not engaged by said harvesting means, said cane lifter means comprising a cylinder having thread means thereon for lifting said cane, mounting means mounting said cylinder relative to said frame in advance of said harvesting means, and means for driving said cylinder to cause said thread means to produce motion in an upward direction so as to lift said cane, said mounting means including means for varying the inclination of said cylinder relative to a vertical plane.

2. A grape harvester as set forth in claim 1 including guide means on said frame for guiding said cane away from engagement with said harvesting means after it has been lifted by said cane lifter means.

3. A grape harvester for harvesting grapes from vines having cane thereon in shielding relationship to grape-bearing portions of said grapevines comprising a frame, harvesting means on said frame for harvesting grapes from said grape-bearing portions, cane lifter means mounted on said frame for lifting said cane out of the path of said harvesting means so that said cane is not engaged by said harvesting means, said cane lifter means comprising a cylinder having thread means thereon for lifting said cane, mounting means mounting said cylinder relative to said frame in advance of said harvesting means, and means for driving said cylinder to cause said thread means to produce motion in an upward direction so as to lift said cane, said mounting means including means for adjusting said cylinder in three planes.

4. A grape harvester as set forth in claim 3 including guide means on said frame for guiding said cane away from engagement with said harvesting means after it has been lifted by said cane lifter means.

5. A grape harvester for harvesting grapes from vines having cane thereon in shielding relationship to grape-bearing portions of said grapevines comprising a frame, harvesting means on said frame for harvesting grapes from said grape-bearing portions, cane lifter means mounted on said frame for lifting said cane out of the path of said harvesting means so that said cane is not engaged by said harvesting means, said cane lifter means comprising a cylinder having thread means thereon for lifting said cane, mounting means mounting said cylinder relative to said frame in advance of said harvesting means, and means for driving said cylinder to cause said thread means to produce motion in an upward direction so as to lift said cane, said mounting means including means for moving said cylinder in a lateral direction.

6. A grape harvester as set forth in claim 5 including guide means on said frame for guiding said cane away from engagement with said harvesting means after it has been lifted by said cane lifter means.

7. A grape harvester for harvesting grapes from vines having cane thereon in shielding relationship to grape-bearing portions of said grapevines comprising a frame, harvesting means on said frame for harvesting grapes from said grape-bearing portions, cane lifter means mounted on said frame for lifting said cane out of the path of said harvesting means so that said cane is not engaged by said harvesting means, said cane lifter means comprising a cylinder having thread means thereon for lifting said cane, mounting means mounting said cylinder relative to said frame in advance of said harvesting means, and means for driving said cylinder to cause said thread means to produce motion in an upward direction so as to lift said cane, said cylinder having a vertically oriented axis, and means for adjusting the position of said cylinder on said frame, said means for adjusting the position of said cylinder including means for adjusting the position of said cylinder transversely of said frame.

8. A grape harvester as set forth in claim 7 including guide means on said frame for guiding said cane away from engagement with said harvesting means after it has been lifted by said cane lifter means.

9. A grape harvester as set forth in claim 7 including a second cylinder spaced from said cylinder and having second thread means thereon for lifting said cane.

10. A grape harvester as set forth in claim 9 including means for rotating said cylinders in opposite directions to cause said threads to lift said cane upwardly.

11. A grape harvester as set forth in claim 10 including means for adjusting the position of both of said cylinders.

12. A grape harvester as set forth in claim 10 wherein said thread means and said second thread means are of opposite hand.

13. A grape harvester for harvesting grapes from vines having cane thereon in shielding relationship to grape-bearing portions of said grapevines comprising a frame, harvesting means on said frame for harvesting grapes from said grape-bearing portions, cane lifter means mounted on said frame for lifting said cane out of the path of said harvesting means so that said cane is not engaged by said harvesting means, said cane lifter means comprising a cylinder having thread means thereon for lifting said cane, mounting means mounting said cylinder relative to said frame in advance of said harvesting means, and means for driving said cylinder to cause said thread means to produce motion in an upward direction so as to lift said cane, said cylinder having a vertically oriented axis, and means for adjusting the position of said cylinder on said frame, said means for adjusting the position of said cylinder including means for adjusting the position of said cylinder in an universal manner relative to said frame.

14. A grape harvester as set forth in claim 13 including guide means on said frame for guiding said cane away from engagement with said harvesting means after it has been lifted by said cane lifter means.

* * * * *